March 11, 1941.　　　N. MARTINSEN　　　2,234,445
FRUIT PITTING AND HALVING MACHINE
Filed Jan. 6, 1940　　　3 Sheets-Sheet 2

INVENTOR.
Nikolai Martinsen.
BY Chas. E. Townsend.
ATTORNEY

March 11, 1941.   N. MARTINSEN   2,234,445
FRUIT PITTING AND HALVING MACHINE
Filed Jan. 6, 1940   3 Sheets-Sheet 3
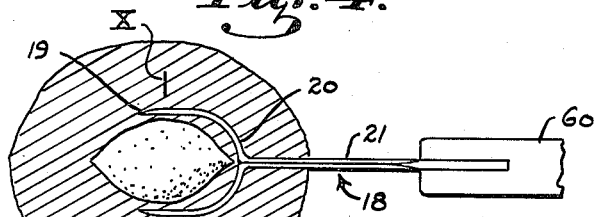
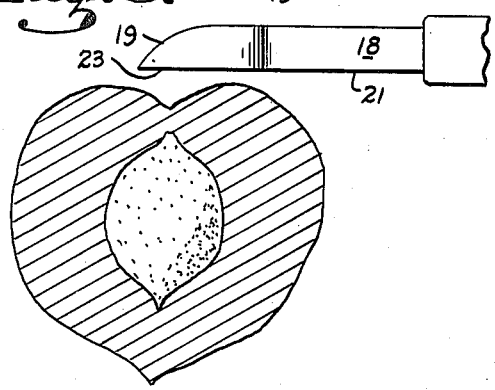
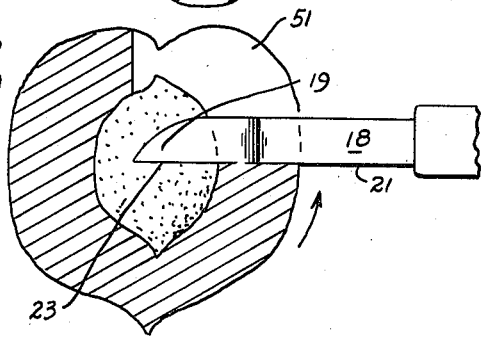
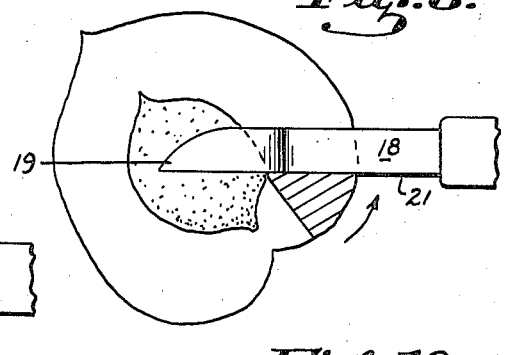
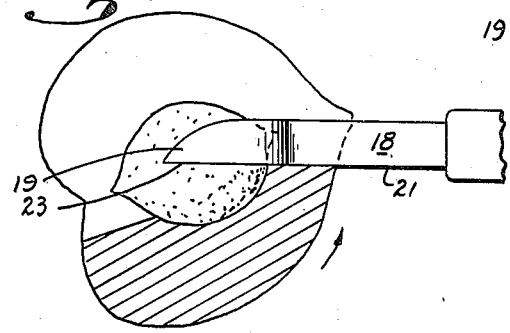
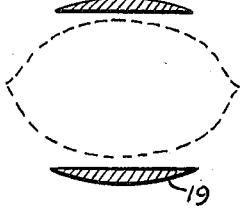
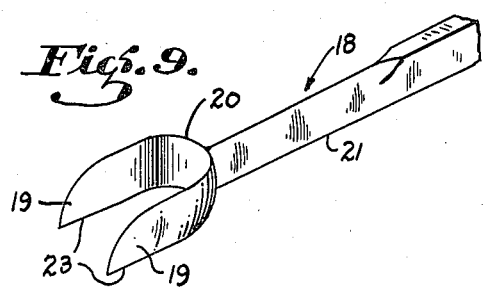
INVENTOR.
Nikolai Martinsen.
BY
Chas. E. Townsend.
ATTORNEY Patented Mar. 11, 1941

2,234,445

UNITED STATES PATENT OFFICE 2,234,445

FRUIT PITTING AND HALVING MACHINE

Nikolai Martinsen, Palo Alto, Calif.

Application January 6, 1940, Serial No. 312,703

5 Claims. (Cl. 146—28)

This invention relates to a fruit pitting and halving machine.

The object of the present invention is generally to improve and simplify the construction and operation of machines of the character described; to provide a machine to which peaches and like fruits may be fed by hand or other feeding means, which grips and secures the fruit delivered thereto, and then automatically halves, pits and discharges the halves and the pits; to provide a machine which is capable of operating on several pieces of fruit at the same time, so as to insure large capacity; to provide a machine which is rotary in action and continuous in operation; and further, to provide a novel form of knife which simultaneously pits and halves the fruit, said knife being adapted for both machine and hand operation.

The machine and the halving and pitting knife are shown by way of illustration in the accompanying drawings, in which Fig. 1 is a central vertical longitudinal section through the machine;

Fig. 4 is a central section through a peach showing the pitting and halving knife after it has entered the fruit;

Fig. 5 is a section at right angles to Fig. 4, showing the position of the knife before entering the fruit;

Fig. 6 is a section similar to Fig. 5 showing the knife after it has entered the fruit;

Figs. 7 and 8 are views showing different positions assumed by the fruit after the knife has entered;

Fig. 9 is a perspective view of the pitting and halving knife; and

Fig. 10 is a cross section taken on line X—X of Fig. 9.

Figure 1:
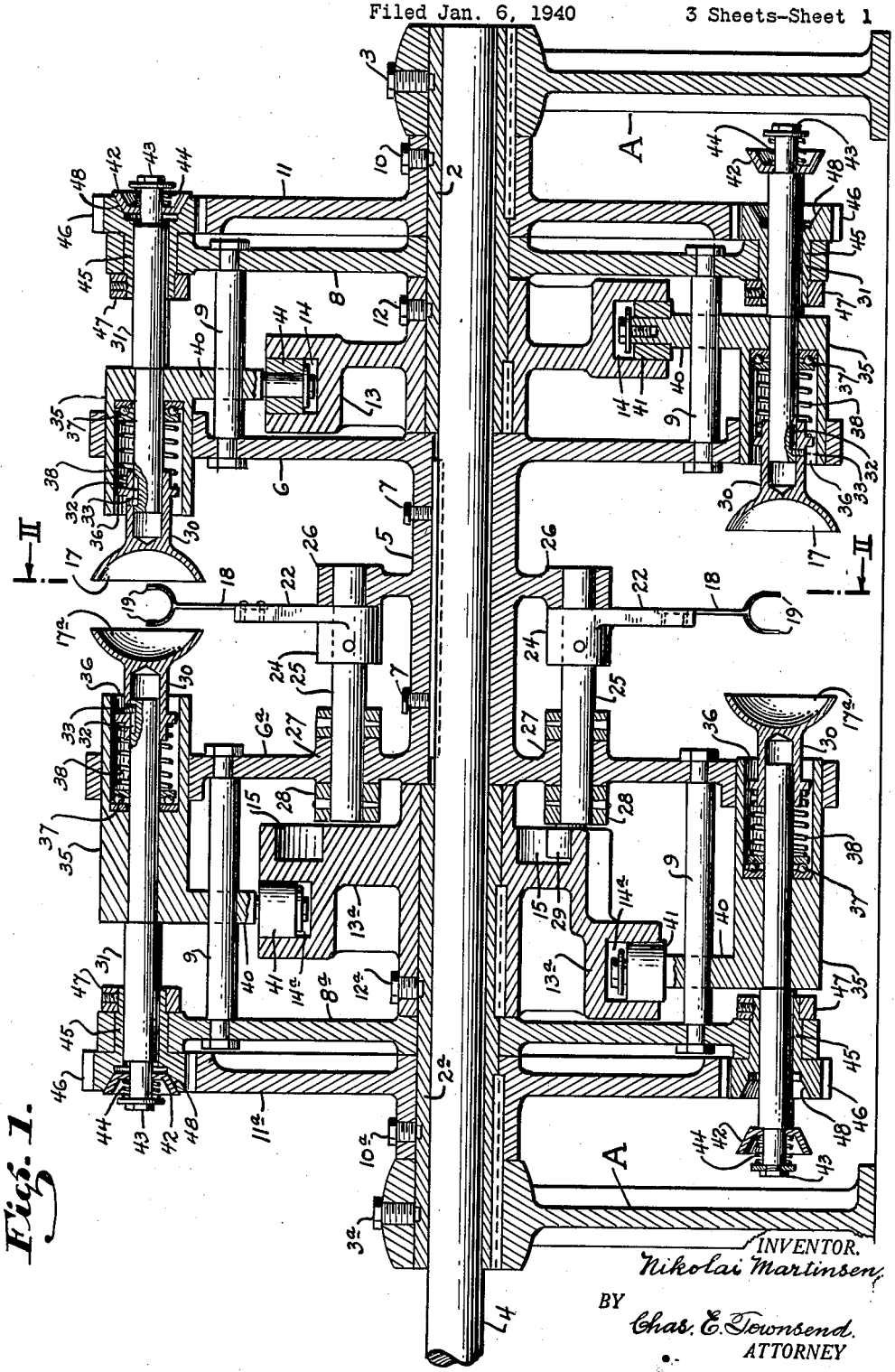

Referring to the drawings in detail, and particularly to Fig. 1, A indicates a pair of standards disposed at opposite ends of the machine, which will hereinafter be referred to as the main frame. Secured in each standard is an inwardly extending bearing sleeve, and these sleeves are indicated at 2 and 2a. Both sleeves will be secured against rotation at all times, and may be secured by keys or set-screws, as shown at 3 and 3a. Extending through the standards and the bearing sleeves is a shaft 4. This shaft may be driven in any suitable manner, and continuous rotation will be imparted thereto when the machine is in operation.

Secured to the shaft between the bearing sleeves 2 and 2a is a rotor which consists of a hub member 5 and a pair of annular side discs 6 and 6a. The hub is keyed or secured to the shaft by means of set-screws 7, and as such will rotate in unison therewith. Also adapted to rotate in unison with the shaft and the rotor are a pair of bearing discs 8 and 8a, these discs being mounted to rotate about the sleeves 2 and 2a. The bearing discs are secured with relation to the side discs 6 and 6a by combination guide and tie rods, such as shown at 9 and 9a, and any suitable number of these rods may be employed to insure a rigid connection between the plates 6 and 8 and the plate 6a and 8a.

Secured on the bearing sleeve 2 by means of a key or set-screw such as shown at 10 is a stationary spur gear 11, and similarly secured as at 10a to the bearing sleeve 2a is a stationary spur gear 11a. Secured on the bearing sleeve 2a as at 12a is a stationary cam 13a in which are formed two cam grooves, one being indicated at 14a and the other at 15. Similarly secured to the bearing sleeve 2 as at 12 is a stationary cam 13 in which is formed a single cam groove such as shown at 14. The cam grooves 14 and 14a are provided for the purpose of actuating gripping members generally indicated at 17 and 17a, as will hereinafter be described, and the cam 15 is provided for the purpose of actuating a fruit pitting and halving knife generally indicated at 18.

This knife is best illustrated in Fig. 9. It consists of a fork-shaped portion having two legs 19 and an inner connecting rounded portion 20. Formed integral therewith and connected to the center part of the rounded portion is a blade 21 which is secured to a crank arm 22 (see Figs. 1 and 2). The forks 19 and the rounded portion 20 form the fruit pitting portion of the knife, while the straight blade 21 forms the halving portion. The lower edges of the fork, together with the rounded portion, are provided with a cutting edge 23, and so is the lower edge of the blade 21. A continuous cutting edge is thus provided, the function of which will hereinafter appear. It should also be noted that the blade 21 and the edges 19 of the fork have a cross-sectional shape such as shown in Fig. 10; and while only one edge 23 is shown as a cutting edge, both the upper and lower edges may be sharpened if desired.

Figure 2:
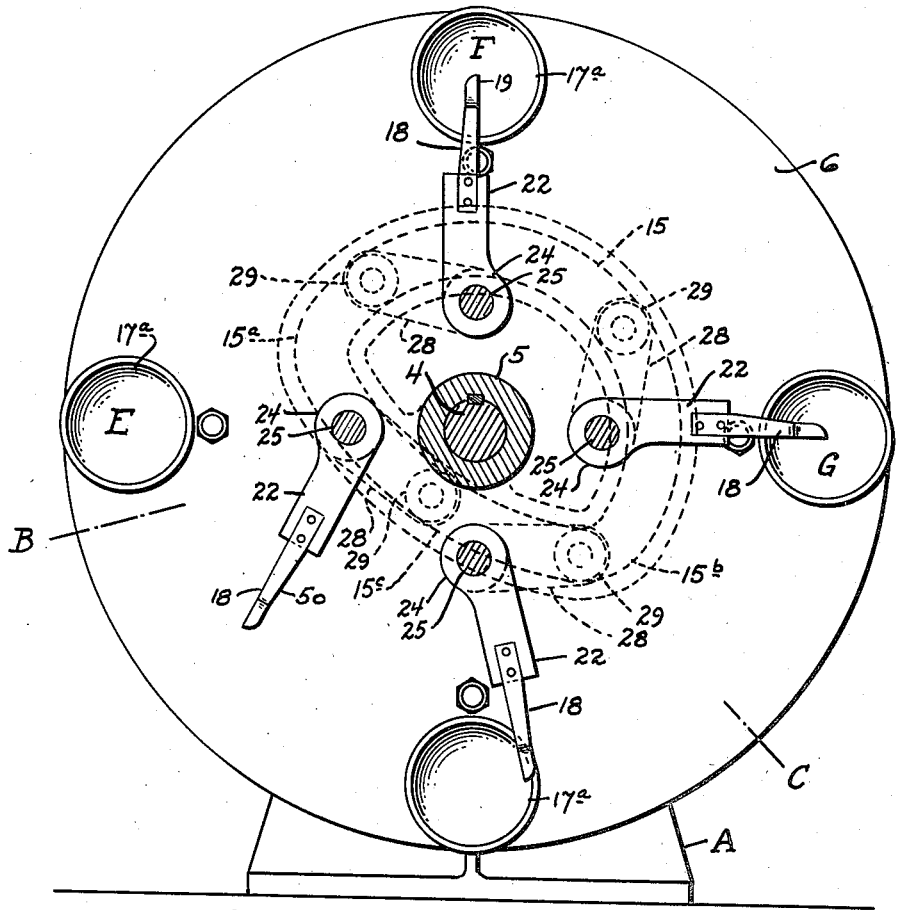
Fig. 2 is a central vertical cross section taken on line II—II of Fig. 1.

Referring to Figs. 1 and 2, it will be noted that the crank arm 22 terminates in a hub 24, and that this is secured to a shaft 25 which is journaled in bearing members 26 and 27. The shaft 25, besides supporting the crank arm and the knife 18, also supports a second crank arm, indicated at 28, and this in turn carries a roller 29 which extends into the cam groove 15. The cam groove 15 is annular, and has the shape shown in dotted lines in Fig. 2; its function will hereinafter be described.

The gripping members 17 and 17a hereinbefore referred to are cup-shaped members, as clearly shown in Figs. 1 and 2, and as they are identical in construction the description of one will suffice. They are provided for the purpose of gripping the fruit to be halved and pitted, and for rotating the fruit one revolution about its own axis, as will hereinafter appear. The cup 17 is provided with a sleeve-like hub 30, and this has a limited sliding movement on a shaft 31. That is, the outer end of the shaft has a key-way formed therein as shown at 32, and into the keyway projects a screw or pin 33 which is secured to the sleeve 30. The shaft 31 is rotatable in a hub 35 which is slidably mounted in the disc 6. The hub has a recess formed therein, as shown at 36, and a thrust bearing 37 is mounted at the inner end thereof. Between this thrust bearing and the sleeve is interposed a helical spring 38 which normally retains the pin 33 in the outer end of the slot 32, but it nevertheless permits yielding movement of the cup 17 when fruits of varying diameter are encountered.

Figure 3:
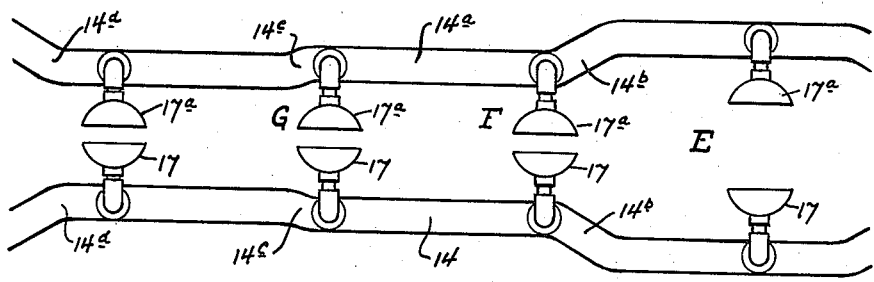
Fig. 3 is a diagrammatic view showing the formation of the cams whereby the fruit gripping members are actuated.

The hub 35 is provided with an arm 40 through which the tie and guide rod 9 extends. The inner end of the arm carries a roller 41, and this extends into the cam groove 14 previously referred to. The cam groove extends completely around the stationary cam 13, and its formation is diagrammatically illustrated in Fig. 3 and will hereinafter be referred to. Suffice it to say that the cam groove serves the function of moving the cups to and away from each other to grip or release the fruit to be halved and pitted, and it also performs the function of engaging or disengaging a clutch member generally indicated at 42. A cone-shaped clutch is shown, which is mounted on the outer end of the shaft 31. A washer and nut are secured at the outer end of the shaft as shown at 43, and a spring 44 is interposed between the cone clutch and the washer so as to permit yielding endwise movement of the cone clutch on the shaft 31.

Journaled in the bearing disc 8 is a hub 45, on the outer end of which is secured or formed a spur gear pinion 46. This pinion is secured against endwise movement in the disc by a collar 47, but it is free to rotate at all times. The outer face of the gear has a cone face 48 formed thereon which cooperates with the cone face 42. The spur gear pinion 46 remains in constant mesh with the stationary gear 11, but as the rotor which carries the shaft 31 rotates, and the gear 11 remains stationary, gear 46 will continuously rotate, but it will not transmit rotary motion to the shaft 31 unless the clutch members are engaged.

The fruit to be halved and pitted, such as peaches and the like, is delivered either by hand or by an automatic feeder to a position between the cups 17 and 17a, at the point indicated at E (see Fig. 2 of the drawings). When the machine is in operation the rotor is continuously rotating, and as the pair of cups approach the position E the feeder will merely place the fruit in the path of the cups, and at this point they will come together and grip the fruit, as cams 14 and 14a have an offset portion such as indicated at 14b (see Fig. 3). When a fruit has been gripped and secured between the cups, continuous rotation of the rotor will bring the cups to the position shown at F. At this time the crank arm 28 will enter the portion of the cam 15 indicated at 15a, and will thus swing the crank arm 28, the shaft 25 and the crank arm 22, together with the knife, from a position exterior of the fruit and the cups, as shown at 50, to a position centrally between the cups, as shown at F in Fig. 2. The fork-shaped end of the knife will thus straddle the pit, as clearly shown in Fig. 6, and will have started the halving cut indicated at 51. At this point another offset in the cams is encountered, as shown at 14c. This imparts further inward movement to the shafts 31, but the cups will not move, as they are already in gripping engagement with the fruit. It is for this reason that the yielding connection is provided, to wit, the spring 38.

When the cups assume their spread or open position indicated in the lower part of Fig. 1, the clutch members 42 will be disengaged, as clearly shown. When the cam portion 14b is encountered, the cups are moved in to the position shown in the upper part of Fig. 1, to grip the fruit, but the clutch 42 is not quite engaged. When the cam portion 14c is encountered, additional inward movement is imparted to the shafts 31, and the clutch members will then engage, causing the rotation of the gears 46 to rotate the shafts 31 and the cups 17 and 17a, thereby causing the fruit to revolve about its own axis as indicated in Figs. 7 and 8, causing the pit to be cut free from the fruit by the fork-shaped portion of the knife, and the fruit to be halved by the blade portion 21.

Slightly more than one revolution is imparted, for instance 1¼ or 1½ revolutions, as there may be some slippage of the fruit with relation to the cups; theoretically, one revolution would suffice. The revolution of the cups and the fruit takes place between the position shown at F and that indicated at G. At this point the cam grooves turn outwardly as indicated at 14d. The clutches are thus immediately disengaged, and the cups are spread to assume the lower position shown in Fig. 1; the two halves of the fruit, together with the pit, are thus permitted to fall free from between the cups and to be received and carried away by a conveyor or belt, or similar means, not here shown. The release of the clutches and the separation of the cups takes place somewhere between the position G and the line indicated at C, and the cups will thus remain open until the line B or the position E is approached; the cups will hold the fruit and no rotation will be imparted until the position F or G is encountered.

A pair of cams such as shown at 14 and 14a are required to operate the gripping cups, as these are arranged in pairs, but a single cam such as shown at 15 is sufficient to actuate the pitting and halving knife. The rounded portion of the cam groove, starting at 15a and ending at 15b, actuates the crank arms and knife to assume the positions shown at F and G, in Fig. 2, while the flattened portion of the cam groove, indicated at 15c, swings the crank arms and knife from the positions shown at F and G to the position shown at 50.

In actual practice there may be as many pairs of gripping cups as the size or diameter of the rotor permits; in this instance four pairs are illustrated. Four knives will accordingly be required.

All operations are entirely automatic, as the rotor is driven by the shaft 4, and the shaft 31 which actuates the gripping members is either held stationary or rotated when the clutch is engaged, and this is also automatically accomplished. That is, the clutches are moved in and out by cam action, and the gears 46 are always rotated as they mesh with the stationary gears 11 and 11a.

While the pitting knife has been shown as machine-operated, it may also be used for hand operation, and in that case the blade 21 will be fitted with a handle such as shown at 60 (see Fig. 4). The operation will be substantially the same; that is, a person employing the knife will first insert it into the fruit until it assumes the position shown in Fig. 6, and will then either rotate the fruit or swing the knife about the fruit. In doing so, the pit is cut free from the fruit by the fork-shaped portion of the knife, and the fruit is halved by the blade portion 21.

While this and other features of my invention have been more or less specifically described and illustrated, I nevertheless wish it understood that changes may be resorted to within the scope of the appended claims, and that the materials and finish of the various parts employed may be such as the manufacturer desires or varying conditions of use demand.

Having thus described and illustrated my invention, what I claim and desire to secure by Letters Patent is:

1. In a machine of the character described a pair of gripping members movable to and away from each other to engage and clamp the exterior surface of a fruit to be halved and pitted, a knife having a fork-shaped portion and a straight portion, both presenting cutting edges, means for moving the knife from a position exterior of the fruit into the same to a point where the fork-shaped portion of the knife straddles the pit, means for rotating the gripping members and the fruit one revolution while the knife straddles the pit to cut the pit free from the fruit and to simultaneously halve the same, and means for separating the gripping members to permit the two halves and the pit to fall free from the knife and the gripping members.

2. In a machine of the character described a main frame, a rotor journaled therein, a pair of gripping members carried by the rotor, adapted to engage and clamp the exterior surface of a fruit to be halved and pitted, a knife pivotally mounted on the rotor, said knife having a pit cutting portion and a portion for halving the fruit, means for swinging the knife about its pivot to a pitting and halving position with relation to the fruit, means for rotating the fruit one revolution after the knife has assumed said position to pit and halve the fruit, and means for separating the gripping members after rotation of the fruit to permit the two halves and the pit to fall free from the knife and the gripping members.

3. In a machine of the character described a main frame, a rotor journaled therein, a pair of gripping members carried by the rotor, means actuated by rotation of the rotor for moving the gripping members to and away from each other to grip or release fruit to be halved and pitted, a knife pivotally mounted on the rotor, said knife having a fork-shaped pit cutting portion and a straight portion to halve fruit placed between the gripping members, means for swinging the knife from a normal inoperative position exterior of the gripping members to a position between the gripping members where the fork-shaped portion will straddle the pit of the fruit, means for rotating the gripping members and a fruit secured between them one revolution while the knife straddles the pit to pit and halve the fruit, means for separating the gripping members after rotation of the fruit to permit the two halves and the pit to fall free from the knife and the gripping members, and means for returning the knife to normal inoperative position.

4. In a machine of the character described a main frame, a rotor journaled therein, a pair of gripping members carried by the rotor, means actuated by rotation of the rotor for moving the gripping members to and away from each other to grip or release fruit to be halved and pitted, a knife pivotally mounted on the rotor, said knife having a fork-shaped pit cutting portion and a straight portion to halve fruit placed between the gripping members, means for swinging the knife from a normal inoperative position exterior of the gripping members to a position between the gripping members where the fork-shaped portion will straddle the pit of the fruit, a clutch cooperating with each gripping member, means for engaging the clutches to rotate the gripping members and the fruit secured between them one revolution while the knife straddles the pit to pit and halve the fruit, means for disengaging the clutches and for separating the gripping members to permit the two halves and the pit to fall free from the gripping members, and means for returning the knife to normal inoperative position.

5. In a machine of the character described a frame, a shaft journaled therein, a rotor secured to the shaft and driven thereby, a pair of opposed gripping members carried by the rotor, a pair of stationary cam members for imparting movement to the gripping members to and away from each other to grip or release a fruit to be halved and pitted, a knife pivotally mounted on the rotor, said knife having a fork-shaped pit cutting portion and a straight portion to halve the fruit placed between the gripping members, a stationary cam controlling movement of the knife about its pivot from a normal inoperative position exterior of the gripping members to a pitting and halving position between the gripping members, a clutch cooperating with each gripping member, means on the pair of stationary cams for engaging the clutches to rotate the gripping members and the fruit secured between them one revolution while the knife straddles the pit to pit and halve the fruit, means on the same cams for disengaging the clutches and for separating the gripping members to permit the halves and the pit to fall free from the gripping means, and means on the knife-actuating cam for returning the knife to inoperative position.

NIKOLAI MARTINSEN.